United States Patent
Cho et al.

(10) Patent No.: US 9,534,646 B2
(45) Date of Patent: Jan. 3, 2017

(54) METHOD OF ADJUSTING CLUTCH CHARACTERISTICS OF DCT VEHICLE

(71) Applicants: Hyundai Motor Company, Seoul (KR); Kia Motors Corp., Seoul (KR)

(72) Inventors: Sung Hyun Cho, Whasung-Si (KR); Hwan Hur, Whasung-Si (KR)

(73) Assignees: HYUNDAI MOTOR COMPANY, Seoul (KR); KIA MOTORS CORP., Seoul (KR)

( * ) Notice: Subject to any disclaimer, the term of this patent is extended or adjusted under 35 U.S.C. 154(b) by 0 days.

(21) Appl. No.: 14/674,731

(22) Filed: Mar. 31, 2015

(65) Prior Publication Data

US 2016/0123411 A1      May 5, 2016

(30) Foreign Application Priority Data

Nov. 5, 2014  (KR) .......................... 10-2014-0153208

(51) Int. Cl.
*B60W 10/02* (2006.01)
*B60W 10/04* (2006.01)
(Continued)

(52) U.S. Cl.
CPC ............. *F16D 48/06* (2013.01); *F16D 13/385* (2013.01); *F16D 48/062* (2013.01); *F16H 63/46* (2013.01); *F16D 2500/1045* (2013.01); *F16D 2500/3066* (2013.01); *F16D 2500/3067* (2013.01); *F16D 2500/30415* (2013.01); *F16D 2500/3166* (2013.01); *F16D 2500/31466* (2013.01); *F16D 2500/50236* (2013.01); *F16D 2500/7082* (2013.01); *F16D 2500/70282* (2013.01); *F16D 2500/70605* (2013.01)

(58) Field of Classification Search
CPC ............... F16D 2500/3026; F16D 2500/3027; F16D 2500/30406
See application file for complete search history.

(56) References Cited

U.S. PATENT DOCUMENTS

| 2009/0276129 A1* | 11/2009 | Hwang | F16D 25/123 |
| | | | 701/68 |
| 2013/0018556 A1* | 1/2013 | Williams | F16D 48/06 |
| | | | 701/60 |
| 2014/0121926 A1* | 5/2014 | Yoon | F16H 61/0437 |
| | | | 701/68 |

FOREIGN PATENT DOCUMENTS

| JP | 2009-257127 A | 11/2009 |
| JP | 2013-036484 A | 2/2013 |

(Continued)

*Primary Examiner* — Tisha Lewis
(74) *Attorney, Agent, or Firm* — Morgan, Lewis & Bockius LLP

(57) ABSTRACT

A method of adjusting clutch characteristics of a Double Clutch Transmission (DCT) vehicle may include determining whether gear shifting has been initiated, updating a T-S curve of a release-side clutch by a transmission torque that is determined using an equation of motion of an engine and a clutch, when a condition in which a difference between an engine speed and a speed of a release-side input shaft is satisfied to be above a first predetermined reference value during a first reference period of time when the gear shifting is determined to have been initiated, and when a torque handover has not been initiated, updating the T-S curve of a connection-side clutch by the transmission torque that has been determined using the equation of motion during a period of time from completion of torque handover to completion of the shifting of gears.

7 Claims, 2 Drawing Sheets

(51) Int. Cl.
*F16D 48/06* (2006.01)
*F16H 63/46* (2006.01)
*F16D 13/38* (2006.01)

(56) References Cited

FOREIGN PATENT DOCUMENTS

| KR | 10-2008-0111102 A | 12/2008 |
| KR | 10-2014-0055191 A | 5/2014 |
| KR | 10-2014-0055192 A | 5/2014 |
| KR | 10-2014-0086160 A | 7/2014 |

* cited by examiner

METHOD OF ADJUSTING CLUTCH CHARACTERISTICS OF DCT VEHICLE

CROSS REFERENCE TO RELATED APPLICATION

The present application claims priority of Korean Patent Application Number 10-2014-0153208 filed on Nov. 5, 2014, the entire contents of which application are incorporated herein for all purposes by this reference.

BACKGROUND OF THE INVENTION

Field of the Invention

The present invention relates to a method of adjusting clutch characteristics of a Double Clutch Transmission (DCT) vehicle, and more particularly to a method of adjusting clutch characteristics of a DCT vehicle in which characteristics of transmission torque relating to stroke of an actuator of a dry clutch used in a DCT is learned and thus adjusted.

Description of Related Art

In a dry clutch which is used in a DCT, a transmission torque which can be transmitted by a clutch is controlled by means of an actuator. Because the dry clutch is not provided with an additional sensor for measuring transmission torque of the clutch, characteristics of transmission torque relating to stroke of an actuator are previously measured and then constructed into a map, and stroke of the actuator is controlled at the time of gear shifting, thus allowing the clutch to exhibit a desired transmission torque.

A graph that represents characteristics of transmission torque against stroke of an actuator is referred to as a T-S curve. Since the T-S curve tends to frequently vary depending on temperature of the clutch and decrease in durability, characteristics of the T-S curve contained in a map have to be optimally learned and updated at all times in order to improve quality of gear shifting by accurate control of transmission torque of a clutch at the time of gear shifting.

However, because there is no sensor capable of directly measuring transmission torque of a clutch, characteristics of the T-S curve have to be learned and a map has to be correspondingly amended under the appropriate circumstance and condition of a vehicle. In a conventional technology, since the circumstance and condition under which characteristics of transmission torque of a clutch are learned are restricted to stopping of a vehicle and the like, there is difficulty in continuously obtaining characteristics of a T-S curve that varies with time.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method of adjusting clutch characteristics of a DCT vehicle in which transmission torque characteristics of a clutch can be learned and updated even while gear shifting of a DCT vehicle is performed during running, so as to provide data having more accurate transmission torque characteristics of a clutch, thereby occurrence of shock and vibration in gear shifting is prevented by more optimal control of the clutch, thus improving quality of gear shifting and merchantability of the vehicle.

In an aspect of the present invention, a method of adjusting clutch characteristics of a Double Clutch Transmission (DCT) vehicle by a controller, may include steps of determining whether gear shifting has been initiated, updating a T-S curve of a release-side clutch by a transmission torque that is determined using an equation of motion of an engine and a clutch, when a condition in which a difference between an engine speed and a speed of a release-side input shaft is satisfied to be above a first predetermined reference value during a first reference period of time when the gear shifting is determined to have been initiated, and when a torque handover has not been initiated, updating the T-S curve of a connection-side clutch by the transmission torque that has been determined using the equation of motion during a period of time from completion of torque handover to completion of the shifting of gears.

The method may further include applying the updated T-S curve to an actuator of the clutch.

In updating the T-S curve of the release-side clutch and updating the T-S curve of the connection-side clutch, the equation for determining the transmission torque of the clutch is Tc=Te−Je*(dNe/dt), wherein the Tc is the transmission torque of the clutch, the Te is engine torque, the Je is rotary inertia moment, and the Ne is rotation number of the engine.

The updating of the T-S curve of the connection-side clutch is performed after a second reference period of time is elapsed after the completion of the torque handover and execution of actual gear shifting.

The updating of the T-S curve of the connection-side clutch is performed when a variation of engine torque is lower than a second reference value after execution of the actual gear shifting.

The updating of the T-S curve of the connection-side clutch is performed under a condition that the second reference period of time is elapsed after execution of actual gear shifting and a variation of engine torque is lower than the second predetermined reference value.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
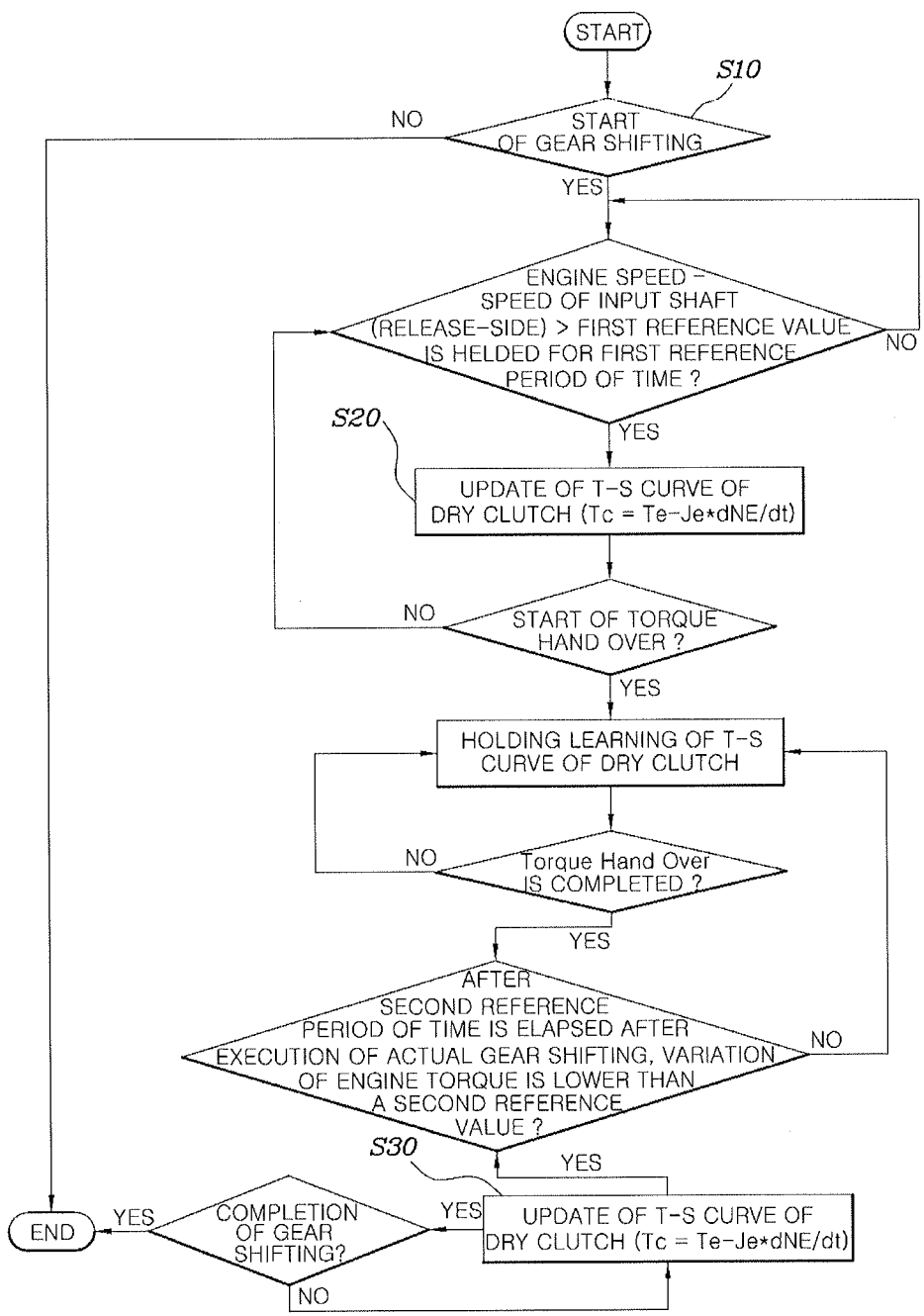
FIG. 1 is a flowchart showing a method of adjusting clutch characteristics of a DCT vehicle according to an embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a method of adjusting clutch characteristics of a DCT vehicle according to an exemplary embodiment of the present invention will be described in detail with reference to the attached drawings.

Figure 2:
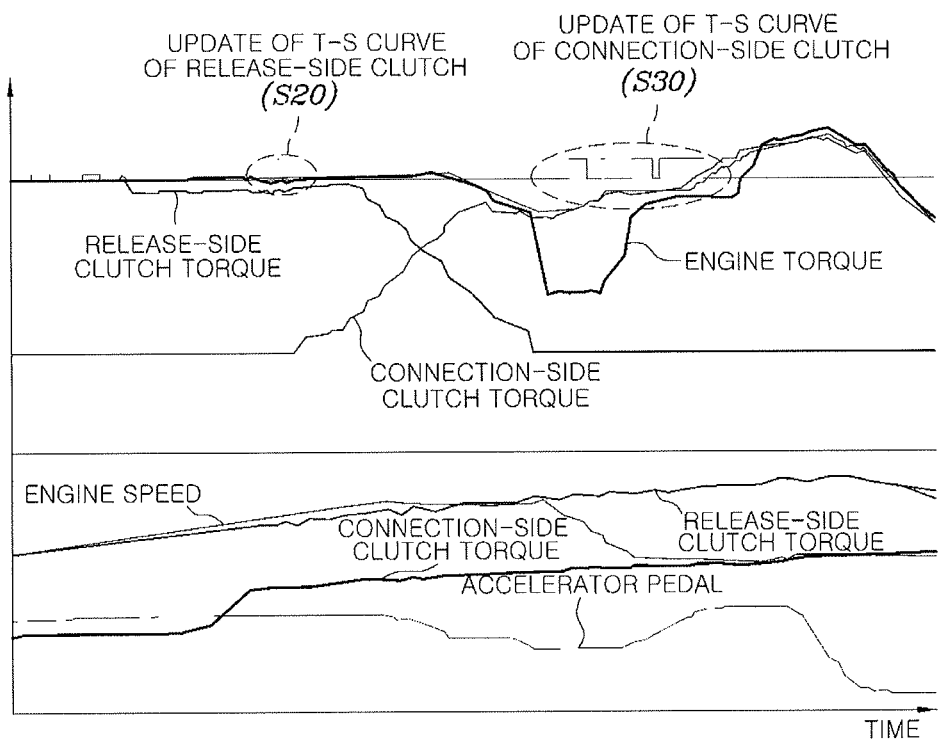
FIG. 2 is a graph illustrating conditions in which the present invention is operated.

Referring to FIGS. 1 and 2, a method of adjusting clutch characteristics of a DCT vehicle by a controller according to an exemplary embodiment of the present invention includes the steps of: determining, by the controller, whether gear shifting has been initiated (S10), updating, by the controller, a T-S curve of a release-side clutch by a transmission torque that is determined using the equation of motion of an engine and a clutch, when it is satisfied that a condition in which the difference between an engine speed and a speed of a release-side input shaft is above a first predetermined reference value during a first reference period of time if the gear shifting is determined to have been initiated, and if a torque handover has not been initiated (S20), and updating, by the controller, the T-S curve of a connection-side clutch by the transmission torque that has been determined using the equation of motion of an engine and an clutch during a period of time from the completion of the torque handover to the completion of the shifting of gears (S30).

More specifically, according to an exemplary embodiment of the present invention, transmission torque characteristics of the relevant clutch can be learned and updated by the controller when the transmission torque of the clutch can be calculated using the equation of motion of an engine and a clutch even during the progress of gear shifting. Consequently, thanks to provision of data having more accurate transmission torque characteristics of a clutch, occurrence of shock and vibration in gear shifting can be prevented by more optimal control of clutch, thus improving quality of gear shifting and merchantability of the vehicle.

Wherein, the controller may be some kind of electric control circuit to control a DCT. The controller does not shown in drawings, but FIG. 1 expresses a flowchart showing a method to be processed in the controller.

In updating the T-S curve of a release-side clutch (S20) and updating the T-S curve of a connection-side clutch (S30), the equation of motion of an engine and a clutch for calculating a transmission torque of the clutch is Tc=Te−Je*(dNe/dt), wherein Tc: Transmission torque of clutch, Te: Engine torque, Je: Rotary inertia moment, and Ne: Rotation number of engine.

In updating the release-side clutch (S20), the first reference value is used to decide whether slip of the release-side clutch occurs to such a degree that the transmission torque of the release-side clutch can be accurately calculated by the equation of motion, and may be set to be, for example, dozens of RPM.

Furthermore, the first reference period of time is used to determine whether it is in such a state that the transmission torque of the release-side clutch can be accurately calculated. In other words, the first reference period of time is used to calculate the transmission torque when a somewhat stable slip condition is established with exclusion of excessive condition, and thus may be set to be several tens of milliseconds. The first reference value and the first reference period of time are preferably determined in a design manner through a large number of experiments and interpretations.

Updating the T-S curve of a connection-side clutch (S30) is performed after a second reference period of time is elapsed after completion of the torque handover and execution of actual gear shifting, or is performed when a variation of engine torque is lower than a second reference value after execution of actual gear shifting.

In this case, in order that the result that is obtained by calculating a transmission torque of the connection-side clutch using the equation of motion becomes a accurate and consistent value, the second reference period of time may be set to be a few milliseconds so as to exclude an excessive condition immediately after the execution of actual gear shifting.

Furthermore, since the second reference value is used to decide whether a variation of engine torque falls within the normal range deviating from the excessive value after the execution of actual gear shifting, the second predetermined reference value is determined to indicate whether a variation of engine torque is within the normal range which allows a transmission torque of the connection-side clutch to be accurately calculated. The second reference value is preferably determined through a large number of experiments and interpretation.

Updating the T-S curve of a connection-side clutch (S30) is performed under the condition that the second reference period of time is elapsed after the execution of actual gear shifting and a variation of engine torque is lower than the second predetermined reference value. Consequently, the transmission torque characteristics of the connection-side clutch can be calculated and updated only when a stricter condition is satisfied.

For reference, the update of transmission torque characteristics of a clutch may be implemented by updating a T-S curve recorded in a map through introduction of a relationship between a calculated transmission torque and a stroke of an actuator at the time into the T-S curve.

As described above, transmission torque characteristics of a clutch can be learned and updated even while gear shifting of a DCT vehicle is performed during running. Accordingly, thanks to provision of data having more accurate transmission torque characteristics of a clutch, occurrence of shock and vibration in gear shifting can be prevented by more optimal control of clutch, thus improving quality of gear shifting and merchantability of the vehicle.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of adjusting clutch characteristics of a Double Clutch Transmission (DCT) vehicle by a controller, the method comprising steps of:

Determining, by the controller, whether gear shifting has been initiated;

Updating, by the controller, a Torque-Stroke (T-S) curve of a release-side clutch by a transmission torque that is determined using an equation of motion of an engine and a clutch, when a condition in which a difference between an engine speed and a speed of a release-side input shaft is satisfied to be above a first predetermined reference value during a first reference period of time when the gear shifting is determined to have been initiated, and when a torque handover has not been initiated;

Updating, by the controller, the T-S curve of a connection-side clutch by the transmission torque that has been determined using the equation of motion during a period of time from completion of torque handover to completion of the shifting of gears.

2. The method according to claim 1, further including:

applying the updated T-S curve to an actuator of the clutch.

3. The method according to claim 1, wherein, in the updating the T-S curve of the release-side clutch and updating the T-S curve of the connection-side clutch, the equation of the motion of the engine and the clutch is $Tc=Te-Je*(dNe/dt)$, wherein the $Tc$ is the transmission torque of the clutch, the $Te$ is engine torque, the $Je$ is rotary inertia moment, and the $Ne$ is rotation number of the engine.

4. The method according to claim 1, wherein the updating of the T-S curve of the connection-side clutch is performed after a second reference period of time is elapsed after the completion of the torque handover and execution of actual gear shifting.

5. The method according to claim 1, wherein the updating of the T-S curve of the connection-side clutch is performed when a variation of engine torque is lower than a second reference value after execution of the actual gear shifting.

6. The method according to claim 5, wherein the updating of the T-S curve of the connection-side clutch is performed under a condition that the second reference period of time is elapsed after execution of actual gear shifting and a variation of engine torque is lower than the second predetermined reference value.

7. The method according to claim 1, wherein the updating of the T-S curve of the connection-side clutch is performed under a condition that a second reference period of time is elapsed after execution of actual gear shifting and a variation of engine torque is lower than a second predetermined reference value.

* * * * *